(12) United States Patent
Sugimoto et al.

(10) Patent No.: US 8,403,385 B2
(45) Date of Patent: Mar. 26, 2013

(54) AUTOMOBILE BUMPER STRUCTURE

(75) Inventors: Shohei Sugimoto, Shizuoka-Ken (JP);
Kodai Taneda, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 107 days.

(21) Appl. No.: 12/731,516

(22) Filed: Mar. 25, 2010

(65) Prior Publication Data

US 2010/0244473 A1 Sep. 30, 2010

(30) Foreign Application Priority Data

Mar. 26, 2009 (JP) .................................. 2009-076156

(51) Int. Cl.
*B60R 19/04* (2006.01)
(52) U.S. Cl. ........................................ 293/133; 293/154
(58) Field of Classification Search .................. 293/133, 293/154
See application file for complete search history.

(56) References Cited

U.S. PATENT DOCUMENTS

| 3,722,876 A | 3/1973 | Schwenk |
| 4,328,986 A | 5/1982 | Weller et al. |
| 6,877,785 B2 * | 4/2005 | Evans et al. .................... 293/120 |
| 2004/0217606 A1 * | 11/2004 | Weykamp et al. ............. 293/133 |

FOREIGN PATENT DOCUMENTS

| DE | 2111309 A1 | 9/1972 |
| DE | 8227405 U1 | 9/1982 |
| DE | 102006038245 A1 | 2/2008 |
| JP | 2008-056011 A | 3/2008 |
| JP | 2008-080922 A | 4/2008 |

OTHER PUBLICATIONS

Office Action from German Application No. 102010012431.1, dated Sep. 15, 2011.

* cited by examiner

*Primary Examiner* — Glenn Dayoan
*Assistant Examiner* — Melissa A Black
(74) *Attorney, Agent, or Firm* — Lerner, David, Littenberg, Krumholz & Mentlik, LLP

(57) ABSTRACT

An automobile bumper structure reduces damage to a vehicle body in an offset collision by having a bumper member in an offset collision area formed by a separate member.

5 Claims, 5 Drawing Sheets

AUTOMOBILE BUMPER STRUCTURE

CROSS-REFERENCE TO RELATED APPLICATIONS

This application claims the benefit of the filing date of Japanese Patent Application No. 2009-076156 filed Mar. 26, 2009, the entire disclosure of which is hereby incorporated herein by reference.

FIELD OF THE INVENTION

The present invention relates to an automobile bumper structure capable of preventing a bumper cushioning member from shifting in the vehicle width direction when an offset collision occurs.

BACKGROUND OF THE INVENTION

Automobile bumpers are disposed at the front and rear of a vehicle body to keep damage to the vehicle body caused by an impact load resulting from a collision or the like to a minimum. As a bumper structure, usually, a bumper member is attached to support parts provided on the vehicle body side, a cushioning member for absorbing an impact is mounted to the bumper member, and a cover member serving as a bumper body is provided on the surface so as to cover the bumper member and the cushioning member (related art JP2008-56011A and JP2008-80922A).

Conventionally, in vehicle collision experiments and the like, a head-on collision has often been assumed. However, it has been revealed that in the actual collision accidents, a collision called an "offset collision", in which an impact is applied at a position deviating from the front to the right or the left, occurs more frequently than head-on collisions. In a head-on collision, the impact is absorbed by the entirety of the front surface of a vehicle, whereas, in the offset collision, the impact is concentrated on the right or the left of the front surface of the vehicle, so that the vehicle is damaged more heavily. For the recent vehicles, the strength and impact absorption of a vehicle body have frequently been designed assuming an offset collision.

In order to reduce damage caused by an offset collision, it is preferable that the bumper member be extended as far as possible to the outside in the vehicle body width direction.

However, by an increase in the distance of the outside in the vehicle body width direction from the support part in which the bumper member of automobile is attached to the vehicle body, the impact load resistance and the rigidity of the bumper member are reduced. Therefore, the deformation of the outside in the vehicle body width direction of the bumper member caused by an offset collision creates a need for replacing the entirety of the bumper member, which increases the repair cost. Also, in an offset collision, the cushioning member sometimes shifts in the vehicle width direction, and in this case, the inherent collision resisting performance cannot be achieved. Also, since the cover member serving as the bumper body has a curvature, when an attempt is made to extend the bumper member so as to match the curvature of the bumper body, the bending fabrication of bumper member is difficult to do because the bumper body is curved greatly.

SUMMARY OF THE INVENTION

The present invention has been made to solve the above problems, and accordingly, an object thereof is to provide an automobile bumper structure capable of reducing damage to a vehicle body caused by an offset collision by means of a configuration in which a bumper member in an offset collision area is formed by a separate member.

To achieve the above object, the present invention provides an automobile bumper structure in which at least a pair of right and left bumper fixing members are provided so as to extend in the vehicle body longitudinal direction from the vehicle body side; a bumper member the back surface of which is supported by the bumper fixing members is provided so as to extend in the vehicle body width direction; a bumper cushioning member, the back surface of which is supported by the bumper member, is provided so as to extend in the vehicle body width direction; and a cover member for covering the outsides of the bumper fixing members, the bumper member, and the bumper cushioning member is provided, wherein an extension member extending toward the outside in the vehicle width direction is provided on the back surface side of both of the right and left end parts of the bumper member; and a locking part is provided in the extension end part of the extension member, and an engagement part that engages with the locking part is provided on the back surface side of both of the right and left end parts of the bumper cushioning member.

In the present invention, a concave part is formed in the back surface of the bumper cushioning member as the engagement part, and a protrusion as the locking part that engages with the concave part is provided in the extension end part of the extension member.

Also, in the present invention, a level difference part that engages with each end part of the bumper member is formed on the back surface of the bumper cushioning member.

Furthermore, in the present invention, a reinforcing member is provided on the plate surface of the extension member facing to the back surface of the bumper cushioning member; and a level difference part facing to the back surface of the bumper cushioning member is provided on the reinforcing member, and a level difference part that engages with the level difference part is provided on the back surface of the bumper cushioning member.

Still further, in the present invention, the extension member may be extended from the back surface side of the bumper member to the outside in the vehicle width direction of the bumper member, and the proximal end part of the extension member is fixed to the bumper fixing member.

Still further, in the present invention, a hole is provided in the bumper member, and a protrusion is provided on the bumper cushioning member at a position facing to the hole in the bumper member, so that when a load is applied to the bumper cushioning member from the front, the protrusion engages with the hole to restrain a shift in the vehicle width direction of the bumper cushioning member.

According to a first aspect of the present invention, the extension member extending toward the outside in the vehicle width direction is provided on the back surface side of both of the right and left end parts of the bumper member; and the locking part is provided in the extension end part of the extension member, and the engagement part that engages with the locking part is provided on the back surface side of both of the right and left end parts of the bumper cushioning member. Therefore, when the bumper cushioning member is deformed by offset collision, the engagement part of the bumper cushioning member engages with the locking part of the extension member, so that the movement in the vehicle width direction of the bumper cushioning member caused by offset collision is regulated, whereby the impact load can be absorbed reliably. Thereby, even if the bumper member is formed into a curved shape, the movement in the vehicle width direction of the bumper cushioning member can be restrained, so that the degree of freedom in designing can be secured.

According to a second aspect of the present invention, the concave part is formed in the back surface of the bumper cushioning member as the engagement part, and the protrusion as the locking part that engages with the concave part is provided in the extension end part of the extension member. Therefore, the movement in the vehicle width direction of the bumper cushioning member can be restrained.

According to a third aspect of the present invention, the level difference part that engages with each end part of the bumper member is formed on the back surface of the bumper cushioning member. Therefore, the movement direction of the bumper cushioning member can be regulated to the vehicle body longitudinal direction, so that the protrusion of the extension member can reliably be engaged with the concave part of the bumper cushioning member. Thereby, the movement direction of the bumper cushioning member at the bumper end part can be regulated in the vehicle body longitudinal direction, so that when an impact load is applied, the protrusion of the extension member can reliably be engaged with the concave part of the bumper cushioning member.

According to a fourth aspect of the present invention, the reinforcing member is provided on the plate surface of the extension member facing to the back surface of the bumper cushioning member; and the level difference part facing to the back surface of the bumper cushioning member is provided on the reinforcing member, and the level difference part that engages with the level difference part is provided on the back surface of the bumper cushioning member. Therefore, when an impact load is applied, the level difference part of the bumper cushioning member is engaged with the level difference part of the reinforcing member, whereby the movement direction of the bumper cushioning member is regulated to the vehicle body longitudinal direction, so that the shift of the bumper cushioning member can be restrained.

According to a fifth aspect of the present invention, the extension member is extended from the back surface side of the bumper member to the outside in the vehicle width direction of the bumper member, and the proximal end part of the extension member is fixed to the bumper fixing member. Therefore, since the deformation of the extension member is restrained, the vehicle body outside of the bumper can be extended more, so that the load can reliably be absorbed.

According to a sixth aspect of the present invention, when an impact load is applied to the bumper cushioning member from the front in offset collision, the protrusion of the bumper cushioning member engages with the hole in the bumper member, whereby a shift in the vehicle width direction of the bumper cushioning member can be restrained.

DETAILED DESCRIPTION OF THE INVENTION

An embodiment of the present invention will now be described in detail with reference to the accompanying drawings.

Figure 1:
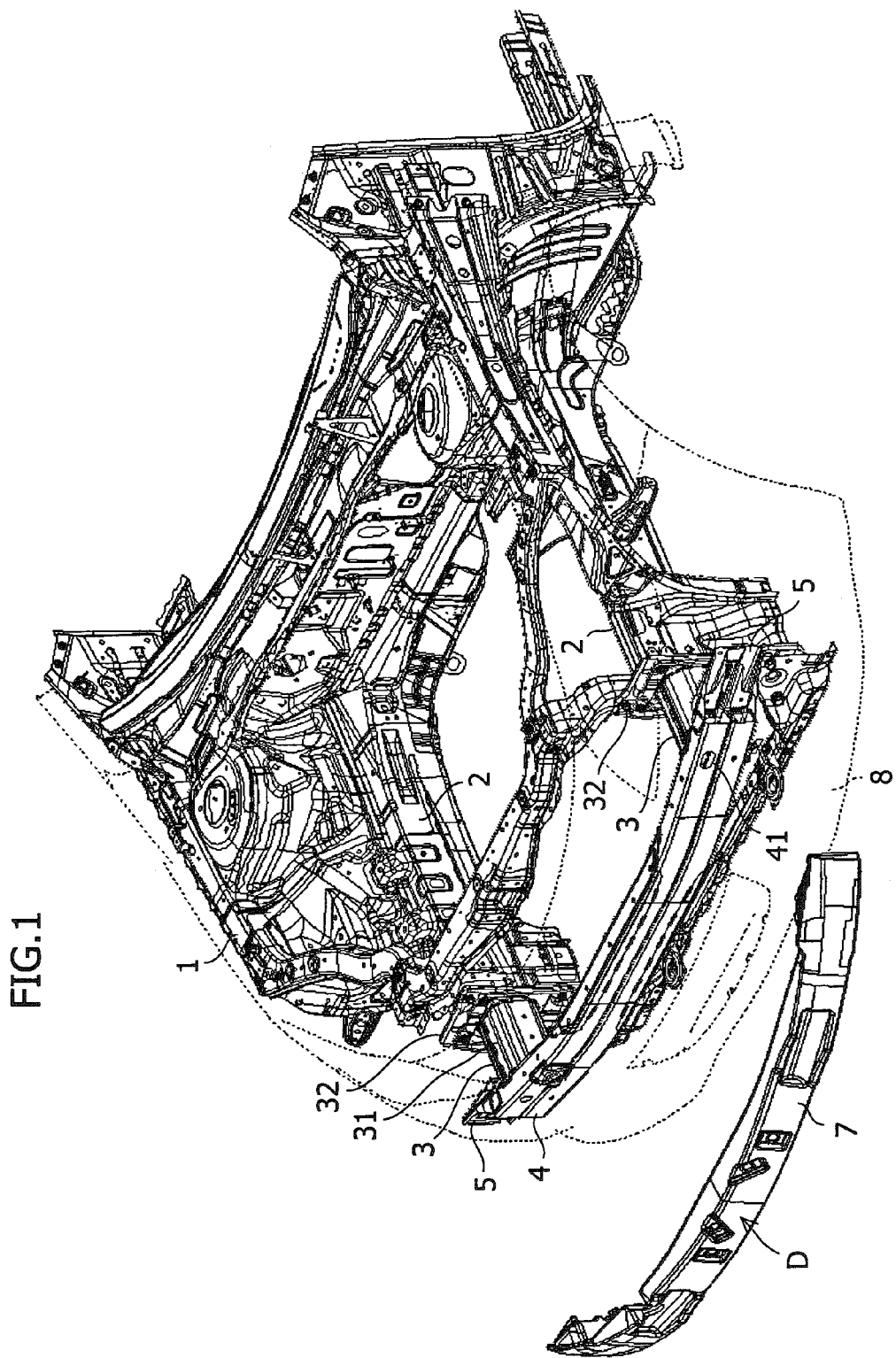
FIG. 1 is a perspective view of a vehicle body front part, showing an automobile bumper structure in accordance with the present invention.

FIG. 1 shows a front vehicle body structure of an automobile. In the front end parts of a pair of right and left front side members 2 constituting a front vehicle body 1, side member extensions 3 serving as bumper fixing members A, each of which is formed into a substantially square tubular shape, are provided in the longitudinal direction of the vehicle body.

The paired right and left side member extensions 3 are mounted to the front surface of the front vehicle body 1 via plates 32 by using screws or by welding, each of the plates 32 being mounted at the proximal end of a main body part 31 formed into a substantially square tubular shape.

The side member extensions 3 are mounted at the right and left of the front surface of the front vehicle body 1 so as to extend in the vehicle body front direction, and a bumper member 4 extending in the vehicle width direction is attached to the distal ends of the side member 3.

Figure 2:
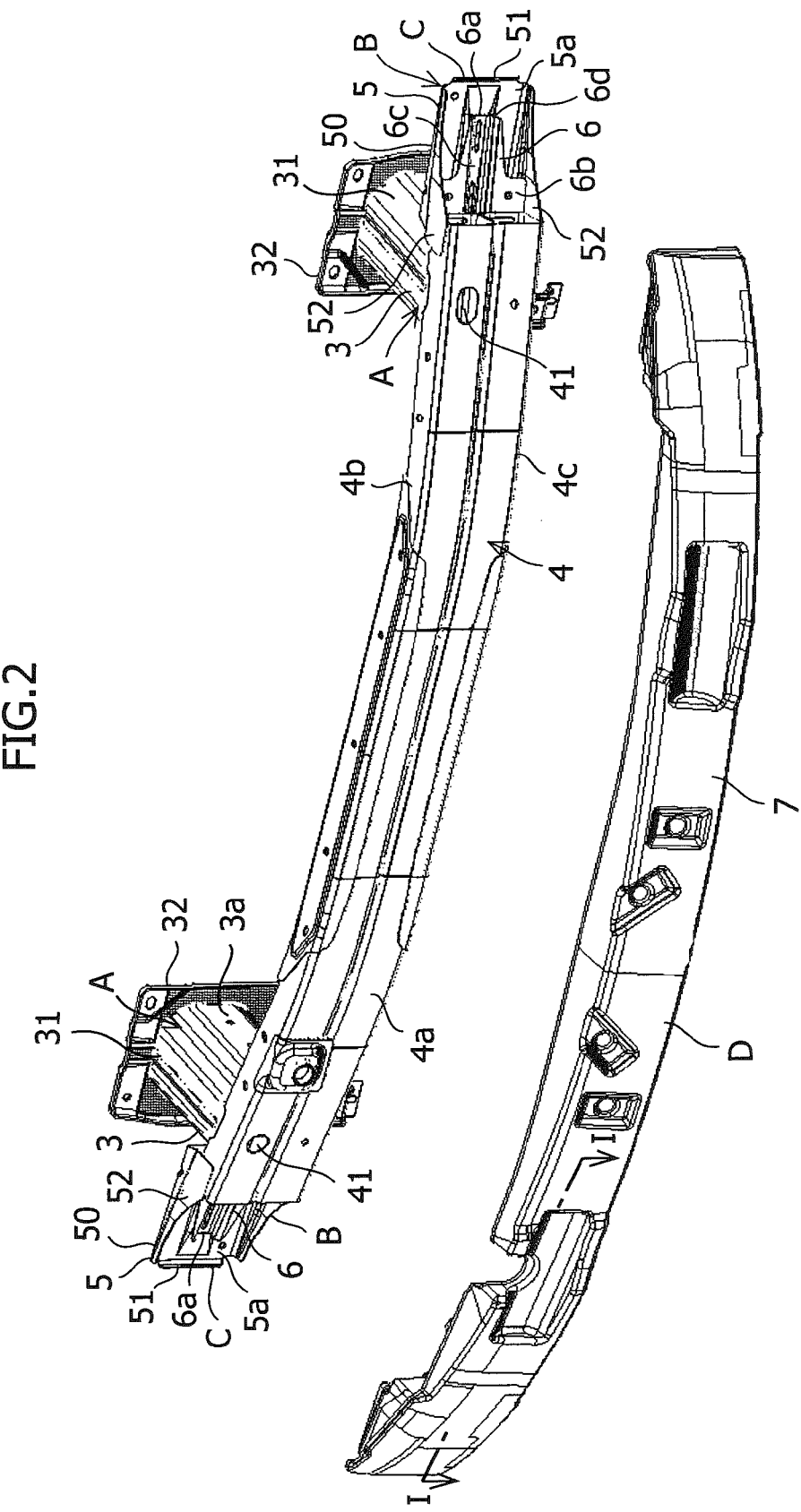
FIG. 2 is a perspective view showing a state in which a bumper cushioning member is removed from a bumper member.

As shown in FIG. 2, the bumper member 4, being a long bumper reinforcing member made of a sheet metal, is curvedly formed into an arcuate shape throughout the entire region in the vehicle width direction so as to form the front surface shape of the front vehicle body 1. On both of the right and left sides of a front surface 4a of the bumper member 4, there are formed a pair of concave parts or holes 41 that engage with a bumper member absorber, described later, when a load is applied.

On both of the right and left sides of the back side of the bumper member 4, bumper member extensions 5 serving as extension members B, which extend from both sides of the bumper member 4 toward the vehicle body outside, are provided. Each of the bumper member extensions 5, being a plate 50 made of a sheet metal, is provided with a protrusion 51 serving as a locking part C, which is curved to the front, in the end part on the outside in the vehicle width direction, and is also provided with projecting pieces 52, each of which extends in a U-shape toward the front, in both upper and lower end parts on the proximal end side. The projecting pieces 52 are fixed to upper and lower surfaces 4b and 4c of the bumper member 4 by welding or the like means, and the end face of the proximal end part between the projecting pieces 52 is joined to a side surface 3a on the vehicle body outside of the side member extension 3.

On a front surface 5a of the bumper member extension 5, a reinforcement 6 for reinforcing the bumper member extension 5 is provided along the vehicle width direction. The reinforcement 6, being a sheet metal member having a substantially hat-shaped cross section, is configured so that a middle convex surface part 6a formed in the vehicle width direction is joined to the front surface 5a of the bumper member extension 5, and both-side flange parts 6b extending in the upper and lower parts are joined to the inner surface sides of the projecting pieces 52 of the bumper member extension 5. On the inside of the convex surface part 6a of the reinforcement 6, a groove 6c having a fixed width is formed in the vehicle width direction.

To the front surface of the bumper member 4, a bumper member absorber 7 serving as a long bumper cushioning member D is assembled in the vehicle width direction as shown in FIG. 2. The bumper member absorber 7, which is molded from, for example, expanded polypropylene, is used to absorb an impact at the time of offset collision. The bumper member absorber 7 has a length corresponding to the total length dimension of the bumper member 4 and the bumper member extensions 5, and is configured so as to cover the front surface side of the side member extensions 3, the bumper member 4, and the bumper member extensions 5.

Figure 3:
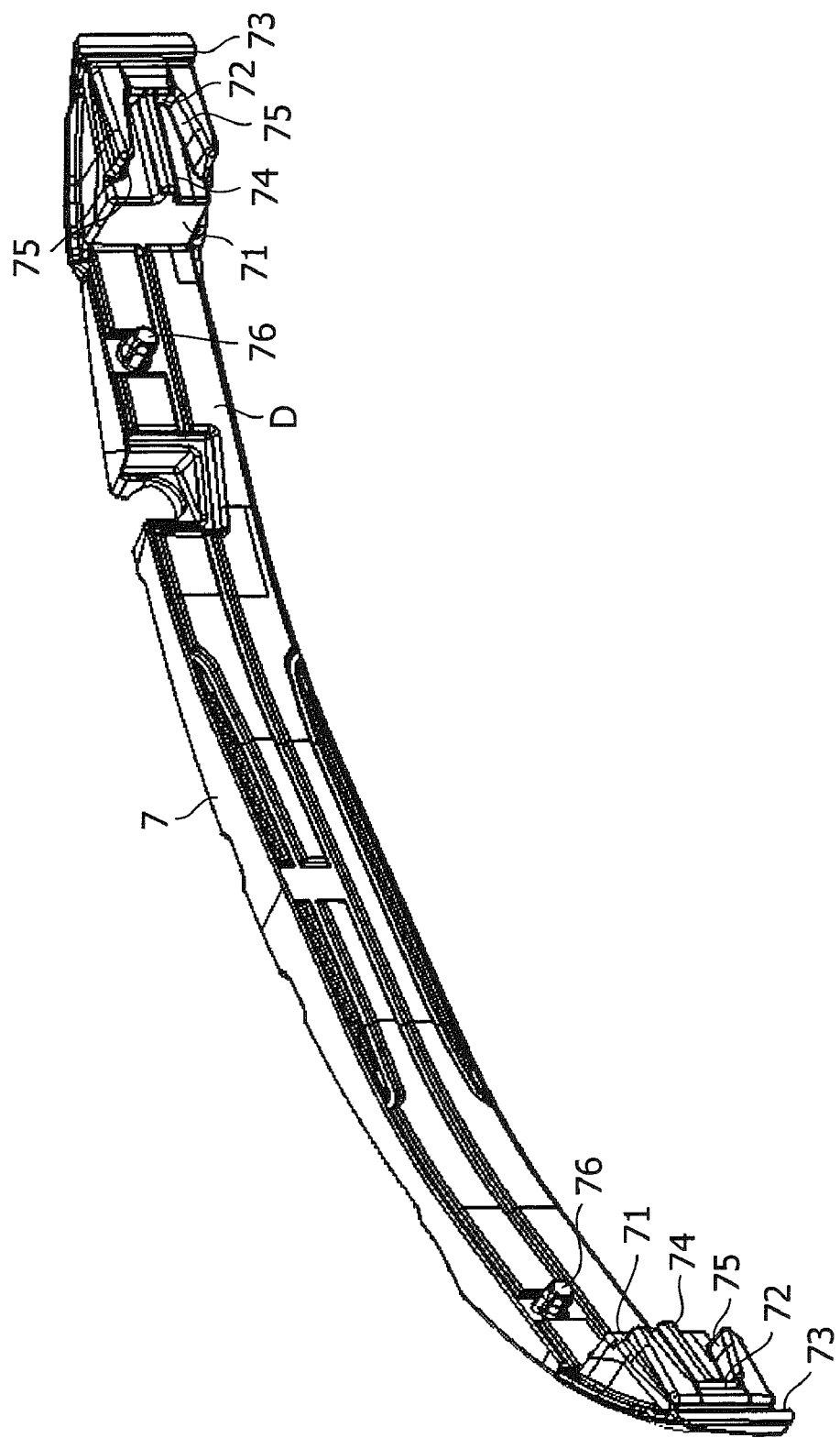
FIG. 3 is a perspective view showing the back side of the bumper cushioning member shown in FIG. 2.

The bumper member absorber 7 is, like the bumper member 4, curvedly formed into an arcuate shape throughout the entire region in the vehicle width direction so as to form the front surface shape of the front vehicle body 1. The bumper member absorber 7 can be formed into any shape so as to form the front surface shape of the front vehicle body 1, and both end parts in the vehicle width direction thereof are curved greatly so as to go around the side surface of the front vehicle body 1. On the back surface of the bumper member absorber 7, level difference parts 71 and 72 having two stages in the vehicle width direction are formed at both end parts of the bumper member absorber 7 as shown in FIG. 3, and at the tip ends of the level difference parts 71 and 72, concave parts 73 are formed at both end positions. Between the first step part 71 and the second step part 72, a protrusion 74 extending in the vehicle width direction so as to project to the back surface side is formed, and a wall part 75 extending in the vehicle width direction so as to surround the protrusion 74 from the upside and the downside is formed in such a manner as to become narrower gradually toward the vehicle body outside.

Figure 4:
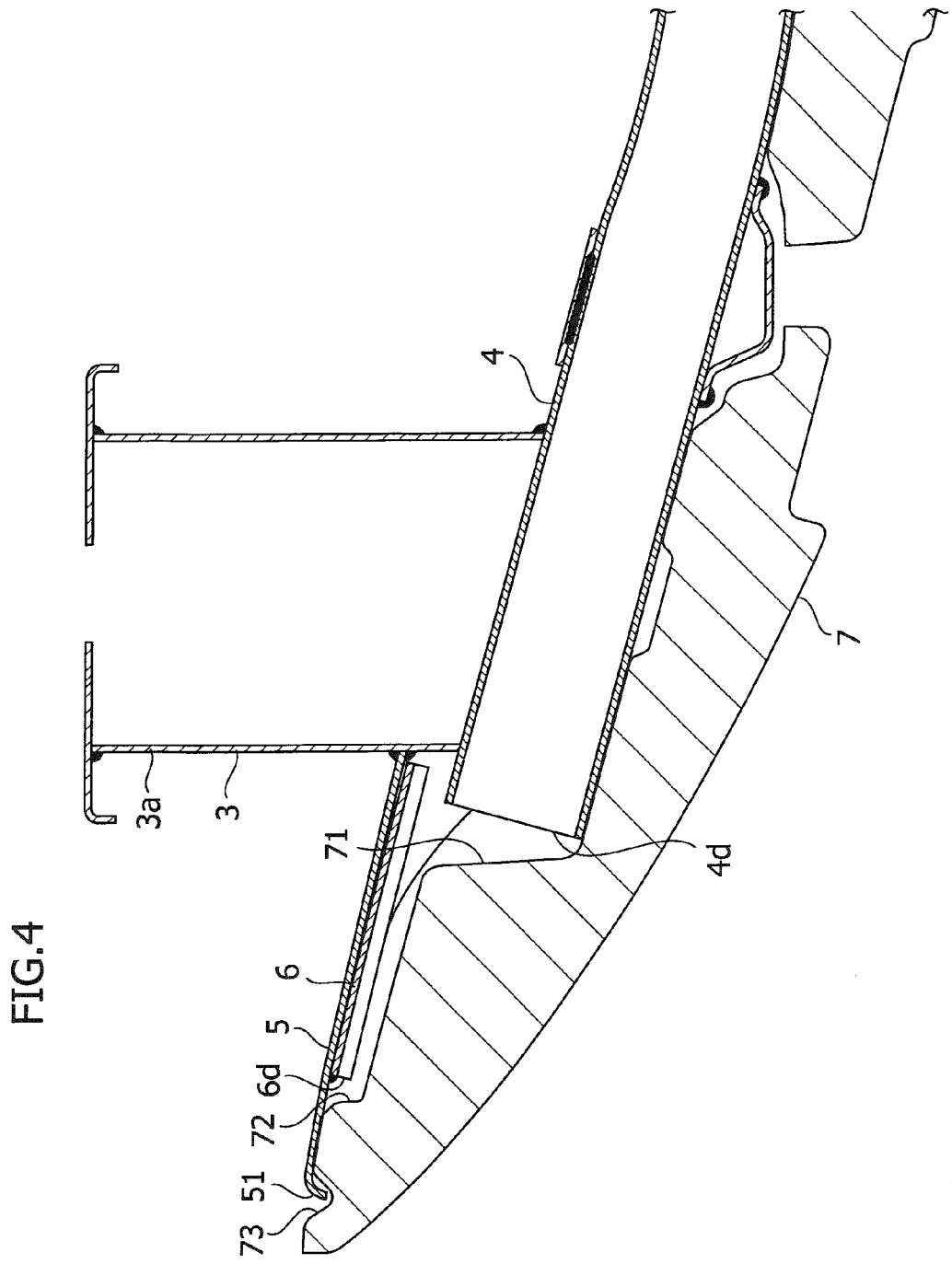
FIG. 4 is a sectional view taken along the line I-I of FIG. 2.

As shown in FIG. 4, the first level difference part 71 of the bumper member absorber 7 is formed so as to engage with an end face 4d of the bumper member 4, and the second level difference part 72 thereof is formed so as to engage with an end face 6d of the reinforcement 6. Also, as shown in FIGS. 2 and 3, the protrusion 74 of the bumper member absorber 7 is configured so as to engage with the groove 6c formed on the inside of the convex surface part 6a of the reinforcement 6. The configuration is made such that the convex surface part 6a of the reinforcement 6 comes into the inside of the wall part 75 of the bumper member absorber 7. Therefore, the position of the bumper member absorber 7 is determined in the vehicle width direction and in the up and down direction.

Also, on both sides of the back surface of the bumper member absorber 7, protrusions 76 projecting toward the vehicle body rear are formed at positions corresponding the holes 41 in the bumper member 4. The protrusions 76 do not engage with the holes 41 in the bumper member 4 when the bumper member absorber 7 is assembled, and engage with the holes 41 therein when a load is applied, thereby restraining a shift in the vehicle body width direction of the bumper member absorber 7. Each of the holes 41 in the bumper member 4 is formed so as to be an elongated hole slightly longer in the vehicle width direction so that the protrusion 76 can engage with the hole 41 even when the bumper member absorber 7 shifts slightly in the vehicle width direction.

On the outside of the bumper member absorber 7, a bumper cover 8 serving as a bumper body is provided so as to cover the side member extensions 3, the bumper member 4, the bumper member extensions 5, and the bumper member absorber 7.

Figure 5:
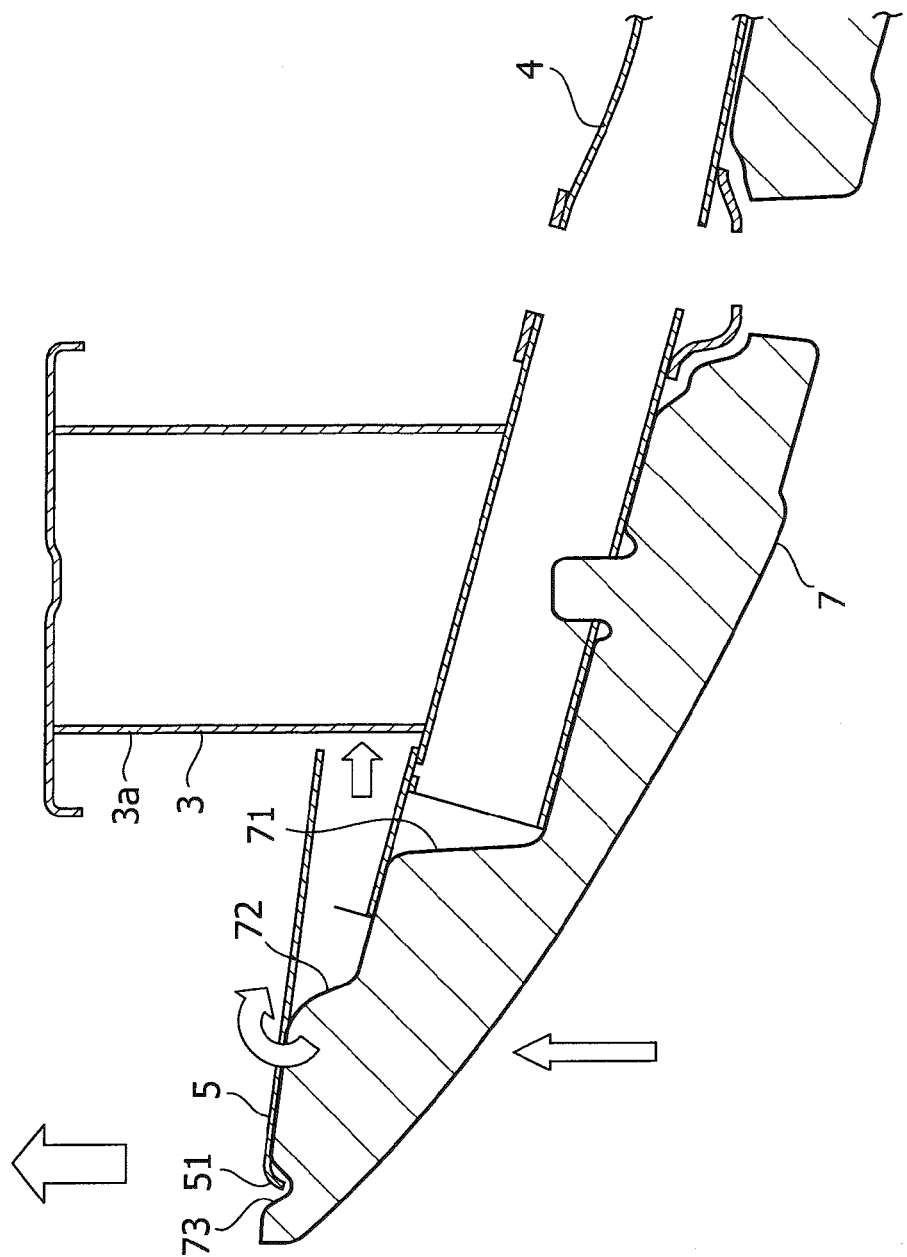
FIG. 5 is a schematic sectional view showing load directions.

In a case in which an impact load indicated by an arrow mark in FIG. 5 is applied from the vehicle body front in offset collision, an inward force acts on the bumper member absorber 7 via the bumper cover 8. At this time, the protrusion 51 of the bumper member extensions 5 engages with the concave part 73 provided at each end position of the bumper member absorber 7 to restrain the deformation of the bumper member absorber 7. Also, the first level difference part 71 of the bumper member absorber 7 engages with the end face 4d of the bumper member 4 to prevent trouble in which the bumper member absorber 7 shifts in the vehicle width direction. Similarly, the second level difference part 72 of the bumper member absorber 7 engages with the end face 6d of the reinforcement 6 to prevent trouble in which the bumper member absorber 7 shifts in the vehicle width direction.

Furthermore, the protrusion 74 of the bumper member absorber 7 engages with the groove 6c formed on the inside of the convex surface part 6a of the reinforcement 6, and the protrusion 76 of the bumper member absorber 7 engages with the hole 41 in the bumper member 4. Therefore, a shift in the up and down direction and in the vehicle width direction of the bumper member absorber 7 is restrained. Also, since the convex surface part 6a of the reinforcement 6 comes into the inside of the wall part 75 of the bumper member absorber 7 and is positioned, trouble in which the bumper member absorber 7 disengages from the end part of the bumper member extension 5 is prevented.

Thus, the impact load indicated by the arrow mark is received by the bumper member extension 5, and is transmitted to the side member extension 3. Therefore, the deformations of the bumper cover 8 and the bumper member absorber 7 are kept to a minimum, and the impact is absorbed by the bumper member absorber 7. Finally, the impact load is transmitted to and is absorbed by the side member extension 3.

According to the above-described embodiment, the bumper member extensions 5 are provided in both end parts of the bumper member 4 to increase the length in the vehicle width direction of the bumper member, and the protrusions 51 serving as the locking parts C are formed in the outside end parts of the bumper member extensions 5 so that the concave parts 73 of the bumper member absorber 7 engage with the protrusions 51. Therefore, trouble in which the bumper member absorber 7 shifts in the vehicle body width direction in an offset collision can be prevented. Also, since both the end parts of the bumper member 4 are extended by the bumper member extensions 5, the bumper cover 8 can be deformed according to its curve, so that the degree of freedom in layout increases, and the weight of the bumper member 4 can be reduced by its reduced size. Furthermore, since the protrusions 74 of the bumper member absorber 7 engage with the grooves 6c formed on the inside of the convex surface parts 6a of the reinforcements 6, a shift in the up and down direction and in the vehicle width direction of the bumper member absorber 7 is restrained.

The first level difference part 71 of the bumper member absorber 7 engages with the end face 4d of the bumper member 4, whereby trouble in which the bumper member absorber 7 shifts in the vehicle width direction can be prevented. Therefore, trouble in which the bumper member absorber 7 shifts in the vehicle width direction with respect to the bumper member 4 in offset collision can be prevented. Similarly, the second level difference part 72 of the bumper member absorber 7 engages with the end face 6d of the reinforcement 6, whereby trouble in which the bumper member absorber 7 shifts in the vehicle width direction can be prevented. Therefore, trouble in which the bumper member absorber 7 shifts in the vehicle width direction with respect to the bumper member 4 in offset collision can be prevented.

The present invention is not limited to the above-described embodiment. For example, in the above-described embodiment, the protrusion 51 provided as the locking part C in the outside end part of the bumper member extension 5 is formed by bending the outside end part of the bumper member extension 5. However, a protrusion may be formed by being welded to the outside end part of the bumper member extension 5. Also, the concave part 73, the first level difference part 71, and the second level difference part 72 formed in the bumper member absorber 7 may have any shape if they can engage with the protrusion 51, the bumper member 4, and the reinforcement 6, respectively. Furthermore, in the above-described embodiment, the explanation has been given of a front bumper. However, it is a matter of course that the present invention can be applied to a rear bumper in the same way. In addition, it is a matter of course that modifications and changes can be made appropriately without departing from the spirit and scope of the present invention.

The present invention can be applied to not only a bumper structure of an automobile but also to a bumper structure of any type of vehicle that may undergo an offset collision.

The invention claimed is:

1. An automobile bumper structure, comprising:
   at least one pair of right and left bumper fixing members extending in a vehicle body longitudinal direction from a vehicle body side;
   a bumper member, a back surface of which bumper member is supported by the at least one pair of bumper fixing members and extends in a vehicle body width direction, the bumper member comprising a right end part and a left end part;
   a bumper cushioning member, a back surface of which bumper cushioning member is supported by the bumper member and extends in the vehicle body width direction;
   a cover member for covering outsides of the bumper fixing members, the bumper member, and the bumper cushioning member;
   an extension member, which extension member extends toward an outside in the vehicle width direction and is provided on the back surface side of both the right end part and the left end part of the bumper member;
   a locking part provided in an extension end part of the extension member;
   an engagement part which engages with the locking part, wherein the engagement part is provided on the back surface side of both the right end part and left end part of the bumper cushioning member;
   a first level difference part formed on the back surface of the bumper cushioning member, which first level difference part engages with each of the right and left end parts of the bumper member;
   a reinforcing member provided on a plate surface of the extension member facing toward the back surface of the bumper cushioning member; and
   a second level difference part provided on the back surface of the bumper cushioning member so as to engage with a level difference part provided on the reinforcing member,
   wherein the second level difference part is provided outside the first level difference part in the vehicle width direction.

2. The automobile bumper structure according to claim 1, wherein the engagement part comprises a concave part formed in the back surface of the bumper cushioning member, and
   the locking part comprises a protrusion that is formed in the extension end part of the extension member, which protrusion engages with the concave part.

3. The automobile bumper structure according to claim 1, wherein the extension member extends from the back surface side of the bumper member toward the outside of the bumper member in the vehicle width direction; and
   a proximal end part of the extension member is fixed to the bumper fixing member.

4. The automobile bumper structure according to claim 1, wherein the bumper member includes a hole formed therein, and
   wherein the bumper cushioning member includes a protrusion at a position facing toward the hole in the bumper member, such that when a load is applied to the bumper cushioning member from the front, the protrusion engages with the hole to restrain a shift of the bumper cushioning member in the vehicle width direction.

5. The automobile bumper structure according to claim 1, wherein two-stage level difference parts comprising the first level difference part and the second level difference part are each formed in the vehicle width direction of the bumper cushioning member.

* * * * *